(12) United States Patent
Ueno

(10) Patent No.: US 7,718,966 B2
(45) Date of Patent: May 18, 2010

(54) THERMAL INFRARED SOLID STATE IMAGING DEVICE AND INFRARED CAMERA

(75) Inventor: Masashi Ueno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 176 days.

(21) Appl. No.: 12/098,105

(22) Filed: Apr. 4, 2008

(65) Prior Publication Data

US 2008/0251721 A1  Oct. 16, 2008

(30) Foreign Application Priority Data

Apr. 5, 2007  (JP) ............... 2007-099640

(51) Int. Cl.
*G01J 5/24* (2006.01)
(52) U.S. Cl. .................................. 250/338.4
(58) Field of Classification Search ......... 250/330, 250/332, 338.1, 338.4, 339.02, 339.03, 339.04
See application file for complete search history.

(56) References Cited

U.S. PATENT DOCUMENTS

| 5,952,659 | A | * | 9/1999 | Yoneyama et al. | .......... 250/332 |
| 5,965,892 | A | * | 10/1999 | Tanaka | .................. 250/370.08 |
| 6,031,231 | A | | 2/2000 | Kimata et al. | |
| 6,211,520 | B1 | | 4/2001 | Ishikawa et al. | |
| 6,465,784 | B1 | | 10/2002 | Kimata | |
| RE38,527 | E | * | 6/2004 | Tanaka | .................. 250/370.08 |
| 2002/0195563 | A1 | | 12/2002 | Iida et al. | |
| 2007/0145274 | A1 | * | 6/2007 | Iida | .......................... 250/338.4 |
| 2009/0152465 | A1 | * | 6/2009 | Dupont et al. | ........... 250/338.1 |

FOREIGN PATENT DOCUMENTS

| JP | 2002-300475 | 10/2002 |
| JP | 2003-222555 | 8/2003 |
| JP | 2005-241501 | 9/2005 |

OTHER PUBLICATIONS

Tomohiro Ishikawa, et al., "Low-cost 320 x 240 Uncooled IRFPA Using Conventional silicon IC process", Part of the SPIE Conference on Infrared Technology and Applications XXV, vol. 3698, Apr. 1999, pp. 556-564.

* cited by examiner

*Primary Examiner*—David P Porta
*Assistant Examiner*—David S Baker
(74) *Attorney, Agent, or Firm*—Oblon, Spivak, McClelland, Maier & Neustadt, L.L.P.

(57) ABSTRACT

An infrared solid state imaging device includes a pixel area with arranged infrared detection pixels and a integration circuit for modulating output current based on the output of the pixel. The integration circuit contains an integrating transistor that modulates a current based on the difference in potential between first and second constant current devices, a integration capacitor for storing the modulated current and being reset periodically, a bias current supply transistor, a switch for connecting the drain with the gate of the bias current supply transistor, a capacitor providing AC coupling between the output of the integrating transistor and the integrating capacitor, a gate bias switch for providing the integrating transistor with a bias voltage, a switch for selecting, as input to the integrating transistor, either one of outputs from the first and second constant current devices, and a capacitor for providing AC coupling between the switch and the gate of the integrating transistor.

12 Claims, 11 Drawing Sheets

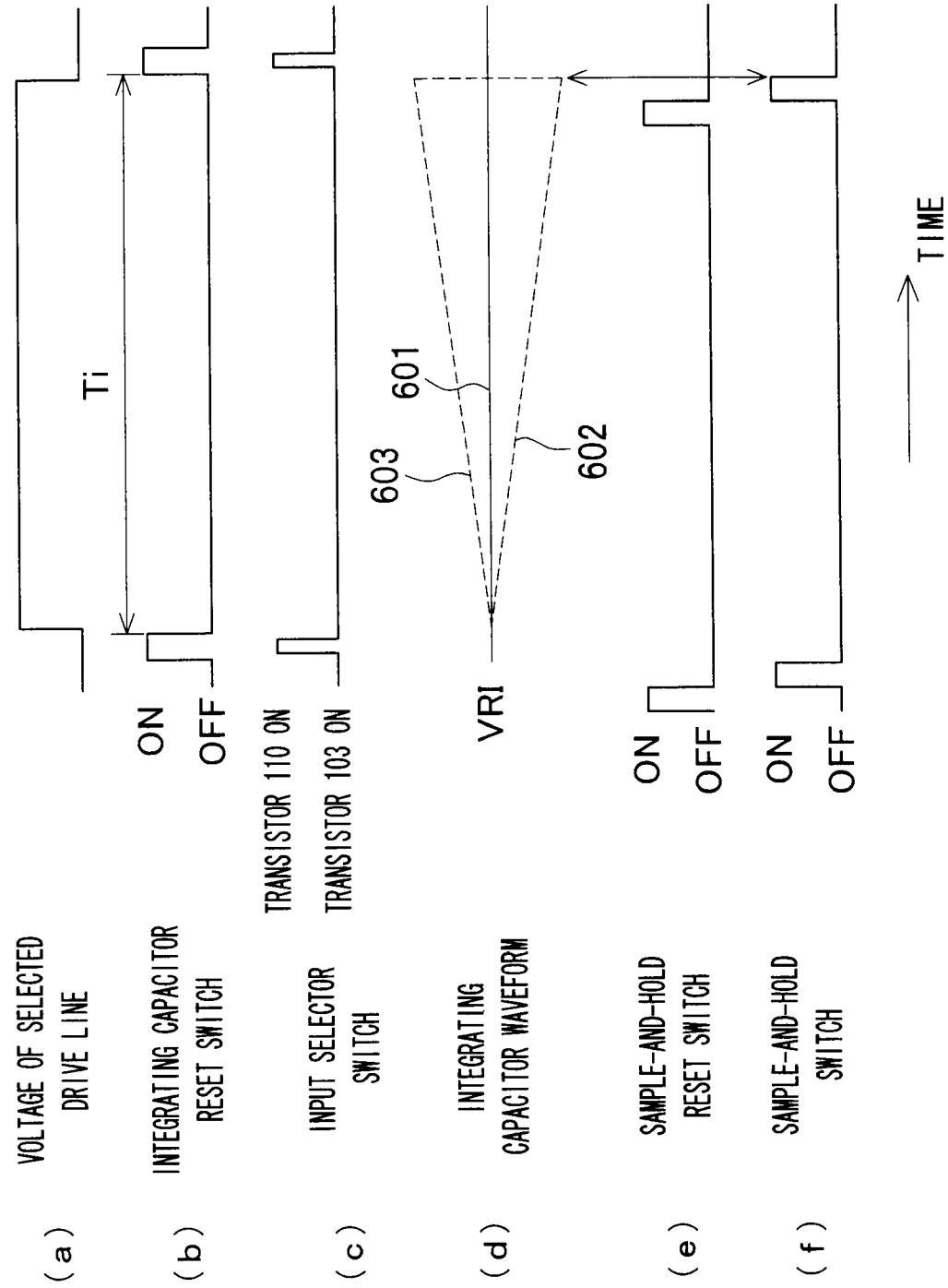

THERMAL INFRARED SOLID STATE IMAGING DEVICE AND INFRARED CAMERA

BACKGROUND OF THE INVENTION

1. Field of the Invention

The present invention relates to a thermal infrared solid state imaging device that detects thermal variations from incident infrared light using a two-dimensional semiconductor sensor array, and relates more particularly to a thermal infrared solid state imaging device that outputs the result of integrating electrical signals from a semiconductor sensor by means of a signal processing circuit, and to an infrared camera that uses this thermal infrared solid state imaging device.

2. Related Art

Various technologies related to thermal infrared solid state imaging devices have been disclosed.

For example, the thermal infrared solid state imaging device described in a non-patent document 1 ("A low cost 320×240 uncooled IRFPA using a conventional silicon IC process", Ishikawa, et al., Part of the SPIE Conference on Infrared Technology and Applications XXV, April 1999, Vol. 3698, pp 556-564 (FIGS. 7 and 9)) has a gate modulated integration circuit in which the forward voltage of a diode that is constant current driven by a transistor is input to the gate of the integrating transistor. A fixed voltage Vss is connected to the source of the integrating transistor, and an integrating capacitor Cin that is periodically reset is connected to the drain. After resetting, the supply voltage is applied to the anode side of the diode of a certain row. If the temperature of the diode is changed due to the infrared light, the gate voltage of the integrating transistor Mi changes, the discharge from the integrating capacitor changes accordingly, and the voltage is read out through a sample-and-hold (S/H) circuit.

The thermal infrared solid state imaging device disclosed in a patent document 1 (JP-A-2005-241501 (FIGS. 1, 2, 7)) provides a selector switch to the gate input of a gate-modulated transistor in the integration circuit, and switches the applied voltage between the pixel voltage and the voltage of a reference pixel that does not have a heat insulation structure. A bias current supply circuit composed of a bias transistor, a switch, and a capacitor is disposed to the drain of the gate-modulated transistor, and a coupling capacitor provides AC-coupling between the integrating capacitor and the drain of the integrating transistor. An integration circuit that achieves high gain without increasing the supply voltage is achieved by the bias current supply circuit suppressing steady discharge of the integrating capacitor. In addition, by determining the bias current when the selector switch switches to the reference pixel and holding the gate bias needed to supply the bias current in the capacitor, output fluctuations caused by variation in the device temperature can be suppressed. In addition, because the gate input conversion voltage of the noise current that is passed by the integrating transistor and the bias transistor immediately before the switch turns off is stored in a capacitor in the bias current supply circuit, low frequency noise (1/f noise) that is substantially constantly during the integration period is not accumulated in the integrating capacitor, thereby helping to reduce noise.

The thermal infrared solid state imaging device taught in a patent document 2 (JP-A-2002-300475 (FIGS. 15 and 16)) performs AC-coupling between the gate of the integrating transistor (amplification transistor) and the pixel area by means of a first coupling capacitor. A sampling transistor is disposed between the gate and the drain of the integrating transistor. The drain of the integrating transistor is connected to a power supply through a reset transistor, and is connected through a control switch and a second coupling capacitor to an integrating capacitor that is periodically clamped by a first switch. A sample and hold circuit composed of a second switch and a capacitor is connected to the downstream side of the integrating capacitor. A reference pixel row that does not have a heat insulation structure is disposed to the last line of the pixel area. In the first half of one horizontal period the drain of the integrating transistor is reset. The second switch is then turned on and the threshold voltage of the integrating transistor is held on the gate side of the first coupling capacitor. The second switch then opens and the reference pixel line is input in the following period. The first switch is left on at this time. As a result, a signal voltage denoting the variation from the threshold voltage is held by the second coupling capacitor. By then opening the first switch and selecting a pixel row, only signals denoting a different temperature than the reference pixel are accumulated in the integrating capacitor. This invention can thus suppress deviation in the threshold voltage of the integrating transistor, reset noise that is accumulated on the gate side of the first coupling capacitor when the second switch is open, and output fluctuations caused by device temperature fluctuations. The second coupling capacitor also functions to suppress the 1/f noise of the integrating transistor and the power supply transistor.

Some problems with the thermal infrared solid state imaging device taught in the non-patent document 1 are described below.

(1) Low voltage drive is difficult because the potential of the integrating capacitor Cin is discharged from the reset voltage Vref during the integration period even in the incident infrared state used as the reference. This problem is particularly pronounced because discharge increases if the bias current is increased to increase sensitivity and increase the gain of the integration circuit, or if the integration time is increased to reduce noise.

(2) The source voltage Vss of the integrating transistor is necessary. Because the current of the integrating transistor depends on the difference between the gate voltage and the source voltage, variation in the source voltage Vss causes the output voltage of the integration circuit to change.

(3) The pixel output voltage changes with change in the ambient temperature. This change cannot be differentiated from the change in incident infrared light.

In the case of the solid state imaging device shown in FIG. 7 in the patent document 1, the voltage on the pixel side of the switch is equal to the power supply voltage minus the forward voltage of the diode and the voltage drop between the drive line and the signal line. The voltage drop is low at the left side near the power supply node and increases to the right side. This voltage drop depends on the current flow and the resistance determined by the pixel pitch and the line width of the drive line. When the line resistance is 0.5Ω per pixel, the pixel current is 10 µA, and the horizontal pixel count is 320, there is a voltage drop of 260 mV between the left end and the right end of the drive line. This voltage is usually a vale that cannot be ignored compared with the threshold voltage of the integrating transistor. Because the mutual conductance of the integrating transistor that determines the gain of the integration circuit is proportional to the (gate voltage−threshold voltage), the gain distribution of the integration circuit occurs horizontally across the pixel area and appears as on the screen as uneven sensitivity. This problem can be reduced by such measures as setting the threshold voltage sufficiently high, reducing the pixel current, or reducing the drive line resistance, but the sensitivity deviation cannot be reduced to zero. There is also a voltage effect distribution on the signal line. But this is not a problem because the voltage drop on the signal line plus the voltage drop on the power supply line can be held constant on all of the vertical lines by setting the power supply line resistance on the drain side of the selector switch connected to the drive line to 1/(horizontal pixel count) of the resistance of the signal line in the pixel area.

Some problems with the thermal infrared solid state imaging device taught in the patent document 2 are described next.

(1) An unexposed pixel reading period and an exposed pixel reading period must be provided in the horizontal scanning period. Both periods must be equal so that the coupling capacitor can be subtracted after integrating both signals. Because the horizontal scanning period is usually determined by the television format, the signal integration time is less than or equal to half the horizontal scanning period. The integration circuit gain that is proportional to the integration time therefore drops, the noise bandwidth that is proportional to the integration time increases, and noise is greater than conventionally.

(2) While suppressing signal variation due to threshold voltage variation in the integrating transistor is an important feature, a long time is required for sampling the threshold voltage of the integrating transistor because the current of the integrating transistor tends to be cut-off.

"A Novel Noise Reduction Technique for the Uncooled Infrared Image Sensor with Bulk-micromachined Pixels," a report on using this method presented at the 12th International Display Workshop/Asia Display 2005 (IDW/AD'05), reported that the 20 μsec duration of one sampling period was shown to be too short, and thus multiple samples were required, recommending five or more samplings. with a normal sensor, it is preferable to set the integration period to the approximately 50 μsec duration of one horizontal scanning period and reset the capacitor in the approximately 10 μsec of the horizontal blanking period. Because current is supplied to the pixels at each horizontal line, the noise bandwidth of the pixels can be reduced the greatest and the SNR of the sensor can be improved. The prior art thus cannot sample the threshold voltage during the horizontal blanking period, and the benefit of sampling during this period cannot be achieved.

The present invention is directed to solving the foregoing problems, and an object of the invention is to provide a thermal infrared solid state imaging device, as well as an infrared camera using the thermal infrared solid state imaging device, that can easily achieve high gain without increasing the power supply voltage, does not require a bias voltage sensitive to gain and the output voltage, has little change in output or uneven image sensitivity due to ambient temperature variation, and can effectively reduce noise including 1/f noise.

SUMMARY OF THE INVENTION

A thermal infrared solid state imaging device according to the invention includes a pixel area, a plurality of drive lines, a plurality of signal lines, a vertical scanning circuit, a second constant current device, an integration circuit, a sample-and-hold circuit, and a horizontal scanning circuit.

The pixel area has a two-dimensional array of infrared detection pixels. The infrared detection pixel includes at least one or more serially connected temperature detection devices having a heat insulation structure and an infrared absorption structure. Each drive line connects the anodes of the pixels in common by row. Each signal line connects the cathodes of the pixels in common by column and is connected to a first constant current device at the end of each column. The vertical scanning circuit sequentially selects the drive line and connects the selected drive line to a power supply. The second constant current device is disposed to each signal line near the first constant current device, and supplies a current substantially equal to a current by the first constant current device. The integration circuit outputs a current modulated by the difference in potential between the first constant current device and the second constant current device. The sample-and-hold circuit samples and holds the output of the integration circuit. The horizontal scanning circuit selects the output of the sample-and-hold circuit by column.

The integration circuit includes an integrating transistor, an integrating capacitor, a bias current supply transistor, a gate connection switch, an output coupling capacitor, a gate bias switch, an input selector switch, and an input coupling capacitor.

The integrating transistor modulates the output current based on the difference in potential between the first constant current device and the second constant current device. The integrating capacitor stores the modulated current and is periodically reset to a reference voltage. The bias current supply transistor has a gate connected to a holding capacitor and is connected in series to the integrating transistor. The gate connection switch connects and disconnects a node between the bias current supply transistor and the integrating transistor with the gate of the bias current supply transistor. The output coupling capacitor provides AC coupling between the node and the integrating capacitor. The gate bias switch is connected to the gate of the integrating transistor and can supply a bias voltage. The input selector switch is connected to the gate of the integrating transistor, and selects, as input to the integration circuit, either one of the potential of the first constant current device and the potential of the second constant current device. The input coupling capacitor provides AC coupling between the input selector switch and the gate of the integrating transistor.

According to the invention, a holding capacitor connected to the gate of the bias current supply transistor holds the gate voltage of a bias current supply transistor that is required to supply a current flowing depending on the signal input to the integrating transistor when the gate connection switch is on, and the input-converted gate voltage corresponding to the 1/f noise current at this time. When the gate connection switch turns off and the input voltage of the integrating transistor then changes from the voltage when the gate connection switch is on, the change in the integrating transistor current caused by this change flows to the integrating capacitor that is AC coupled at the output coupling capacitor and is integrated. It is therefore not necessary to set the bias voltage in order to set the bias current, and a bias current does not flow to the integrating capacitor. High gain and low noise can therefore be achieved without setting a high integrating capacitor reset voltage or shortening the integration time.

In addition, by providing a reference pixel (non-heat-insulated pixel) that provides an output according to the ambient temperature change without sensing infrared light, and inputting the output of the reference pixel to the integrating transistor when the gate connection switch is on, the bias current is set according to pixel output based on the ambient temperature change. Only the signal current equal to the difference between the reference pixel and the normal pixels is therefore integrated. More specifically, variation in the output due to change in the ambient temperature can be reduced.

Furthermore, because the operating point of the integrating transistor is determined by the gate bias voltage by turning the gate biasing switch on when there is signal input from the reference pixel, the operating point of the integrating transistor can be constant between pixel columns and sensitivity variations can be suppressed when applied to a two-dimensional pixel array.

BRIEF DESCRIPTION OF THE DRAWINGS

FIG. 6A is a timing chart showing the operating timing of the thermal infrared solid state imaging device according to the first embodiment of the invention.

DESCRIPTION OF PREFERRED EMBODIMENTS

With reference to accompanying drawings, preferred embodiments of the invention are described below.

Embodiment 1

1. Structure of Thermal Infrared Solid State Imaging Device

Figure 1:
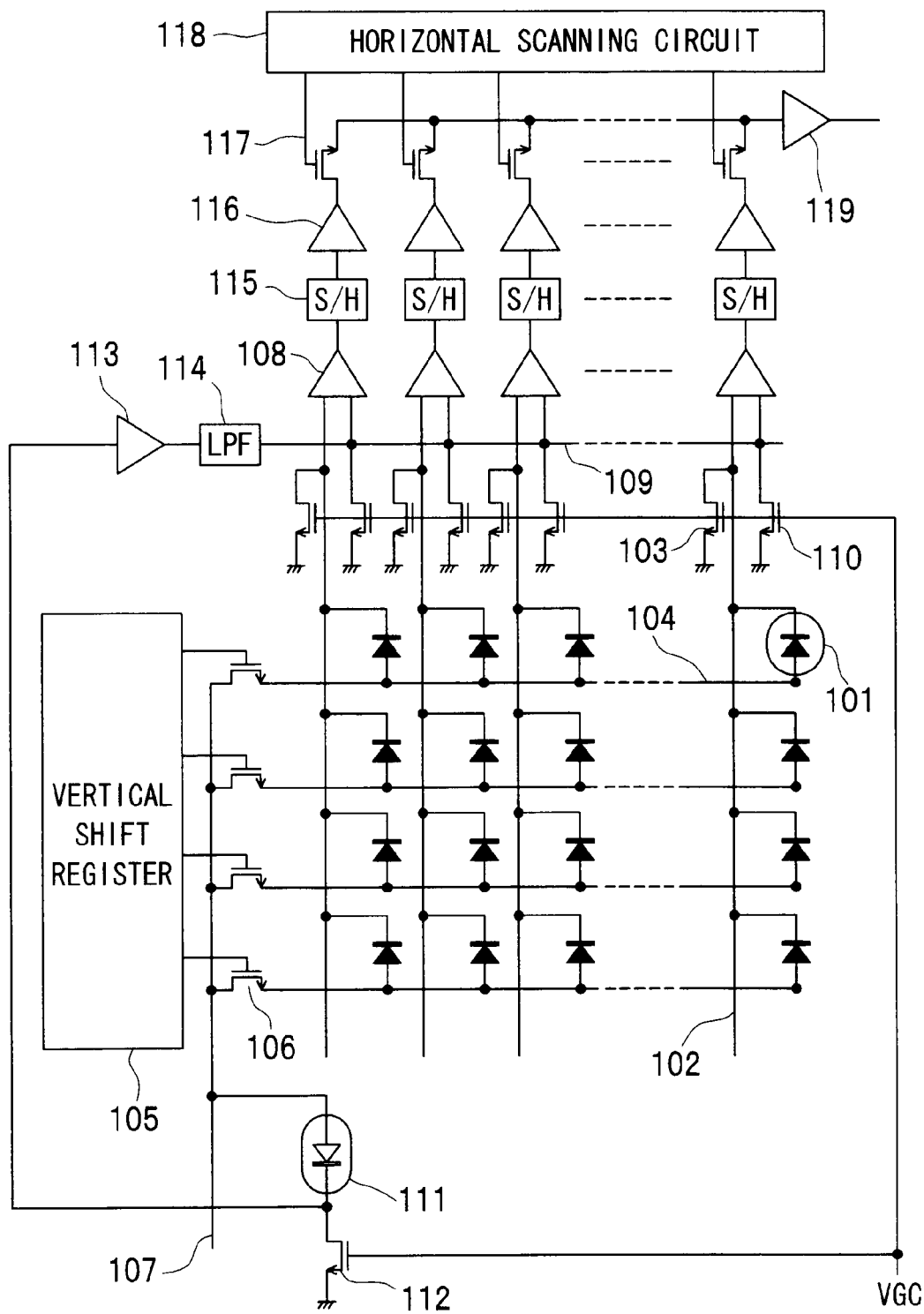
FIG. 1 is a circuit diagram of a thermal infrared solid state imaging device according to a first embodiment of the invention.

FIG. 1 is a circuit diagram of the thermal infrared solid state imaging device according to a first embodiment of the invention.

An infrared detection pixel 101 includes a heat-insulated diode. The infrared detection pixels 101 are arranged in a two-dimensional pixel matrix, forming a pixel area. The cathode of each infrared detection pixel 101 (diode) is connected in common by column to a vertical signal line 102, and a transistor 103 is connected to the end of each vertical signal line 102. The gates of the transistors 103 are connected in common, and a bias voltage VGC for operating in the saturation range is applied to the gates. The transistor 103 thus operates as a constant current source that supplies a constant current to the infrared detection pixel 101. The anodes of the infrared detection pixels 101 are connected in common by row by a horizontal signal line 104. The ends of the horizontal signal lines 104 are connected to a power supply line 107 through a vertical selection transistor 106 that is driven by a vertical shift register 105.

A transistor 110 of the same configuration is disposed beside the transistor 103. The drains of the transistors 110 are commonly connected by a dummy drive line 109. The gates of the transistors 110 are also connected in common, and the same bias voltage applied to the transistors 103 is applied to the gates of the transistors 110. The dummy drive line 109 is configured identically to the horizontal signal line 104, and the voltage drop distribution of the dummy drive line 109 is therefore the same as on the horizontal signal line 104.

A reference pixel 111 (also called a non-heat-insulated pixel) that reacts not to incident infrared light but to device temperature is disposed to the edge of the pixel area. The reference pixel 111 is driven with a constant current by a current supply 112. A voltage occurs based on the device temperature and appears at the drain of the current supply 112 is applied through a buffer amplifier 113 and low-pass filter 114 used for noise reduction to the dummy drive line 109. The voltage from the drain side of the current sources 110 and 103 is input to a differential integration circuit 108, and the differential integration circuit 108 integrates only the difference of the drain signals from the current sources 110 and 103. This difference signal is the signal obtained by removing the voltage drop distribution in the horizontal signal line 104 and the variation due to the device temperature from the signal corresponding to the incident infrared light. The integrated signal is held by the sample-and-hold circuit 115. While the pixel output from the next horizontal line is being integrated in the same way, the signals for the previous line held by the sample-and-hold circuit 115 are input to a buffer amplifier 116 and an output amplifier 119 through a horizontal selection transistor 117 that is sequentially selected by the horizontal scanning circuit 118.

The arrangement for integrating the potential of the dummy drive line 109 to which the reference pixel 111 signals are input and the output of the infrared detection pixel 101 by means of the differential integration circuit 108 is the same as described in JP-A-2003-222555, previously filed by the applicant of the present application. JP-A-2003-222555 discloses a differential integration circuit that uses four MOS transistors. The present invention describes the arrangement of a differential integration circuit having two MOS transistors and a 1/f noise reduction effect.

1.1 Differential Integration Circuit

Figure 2:
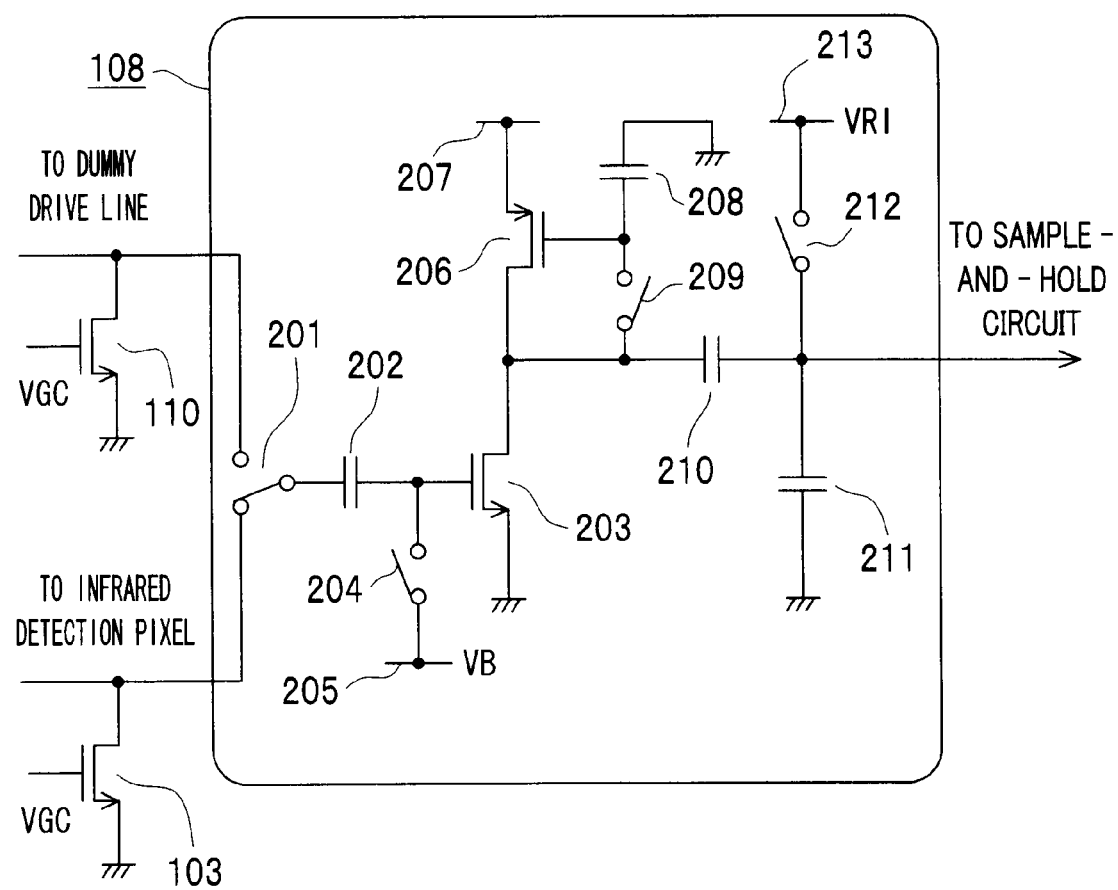
FIG. 2 is a circuit diagram of an integration circuit in the thermal infrared solid state imaging device according to the first embodiment of the invention.

FIG. 2 is a circuit diagram of the differential integration circuit 108. The differential integration circuit 108 in this embodiment of the invention includes a bias current supply transistor 206, a gate connection switch 209 connected to the gate of the bias current supply transistor 206, a hold capacitor 208 connected to the gate of the bias current supply transistor 206, an integrating transistor 203, an input coupling capacitor 202, a gate bias switch 204, an input selector switch 201, an output coupling capacitor 210 and an integrating capacitor 211 connected in series between ground and the drain of the integrating transistor 203, and an integrating capacitor reset switch 212.

The integrating transistor 203 is an n-channel transistor with the source to ground. The bias current supply transistor 206 which is a p-channel transistor is connected in series between the drain of the integrating transistor 203 and the power supply 207. "Connected in series" as used here means to be connected in such a way that a current flows continuously between the source and drain of the two connected transistors. In the example shown in FIG. 2 the source of the bias current supply transistor 206 is connected to the power supply 207, and the drain is connected to the drain of the integrating transistor 203. The gate of the integrating transistor 203 is connected to the input selector switch 201 through the input coupling capacitor 202. The input selector switch 201 switches between the drain voltage of the transistor 103 (that is, the output voltage of the infrared detection pixel 101) and the drain voltage of the transistor 110 (that is, the output voltage of the reference pixel 111). In addition, the gate of the integrating transistor 203 is connected to the bias supply VB through the gate bias switch 204.

The hold capacitor 208 and gate connection switch 209 are connected to the gate of the bias current supply transistor 206. The gate connection switch 209 is for connecting the gate of the bias current supply transistor to the drain (that is, a node between the bias current supply transistor 206 and the integrating transistor 203) of the bias current supply transistor.

In this embodiment of the invention each of the infrared detection pixels 101 and reference pixel 111 is composed of a plurality of diodes that function as temperature sensors and are connected individually or in series. Except for not having a heat insulation structure and/or an infrared absorption structure, the reference pixel 111 is structurally identical to the infrared detection pixel 101.

Figure 3A:
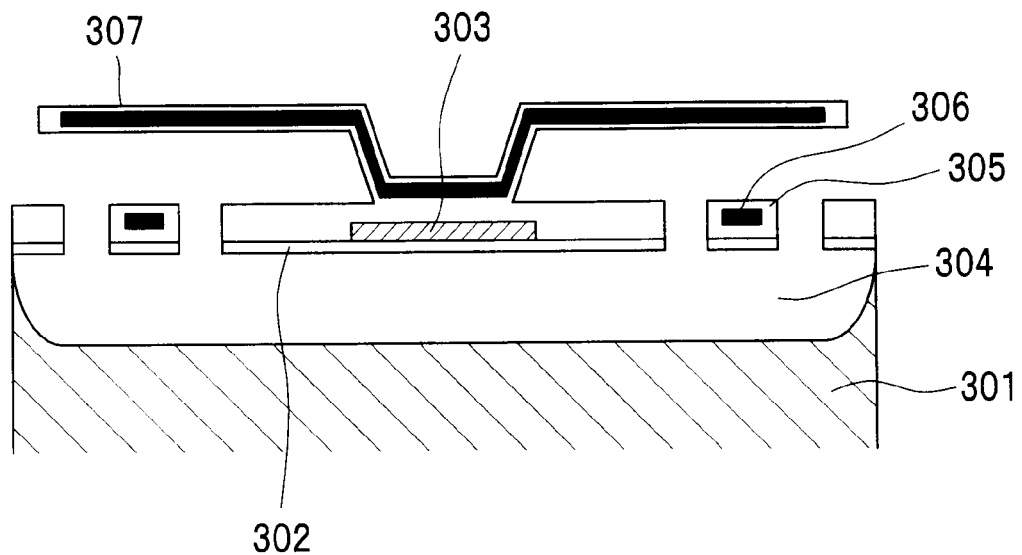
FIGS. 3A and 3B are section view and perspective view of an infrared detection pixel in the thermal infrared solid state imaging device according to the present invention, respectively.
Figure 3B:
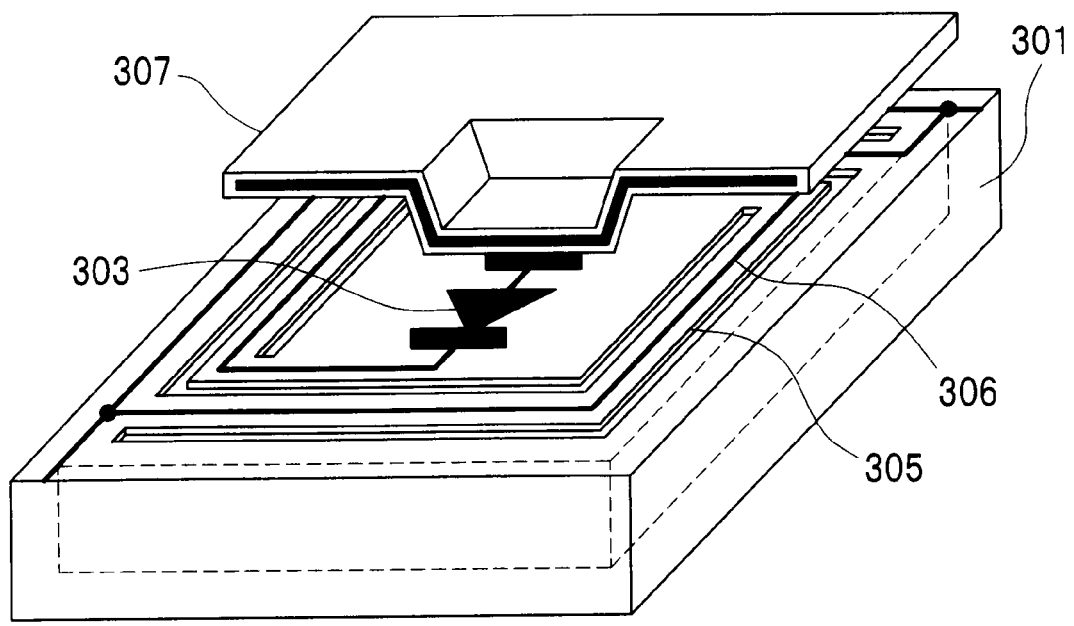

1.2 Structure of Pixel (Temperature Sensor) of the Thermal Infrared Solid State Imaging Device The structure of a pixel (temperature sensor) of the thermal infrared solid state imaging device according to this embodiment of the invention is described next. FIGS. 3A and 3B are a section view and a perspective view schematically showing the structure of the infrared detection pixels 101 in the thermal infrared solid state imaging device according to this embodiment of the invention.

Each infrared detection pixel 101 has a PN junction diode 303 that operates as a temperature sensor supported over an empty recess 304 by two long support legs 305, and the electrode lines 306 of the diode 303 are embedded in the support legs 305. A plurality of diodes 303 are preferably connected in series to increase sensitivity. The recess 304 forms a heat-insulation structure that improves the heat resistance between the diode 303 and the silicon substrate 301. In this embodiment of the invention the diode 303 is formed on the SOI layer of an SOI substrate, and the embedded oxide layer underneath the SOI layer is part of the structure supporting the hollow structure. In order to efficiently absorb infrared light that is incident from above the device as seen in the figures, the infrared absorption structure 307 that is thermally connected to the diode part extends above and beyond the support legs 305. If the diode that operates as the temperature sensor is formed on the SOI layer of the SOI substrate, the temperature sensor can be formed using single crystal silicon, the embedded oxide layer 302 below the SOI layer can be used for the support, and a heat insulation structure can be easily rendered. Note that the infrared absorption structure 307 is omitted from the front part of the figure in FIG. 3B so that the structure of the bottom part can be seen more easily.

When infrared light is incident to the infrared detection pixel 101, the light is absorbed by the infrared absorption structure 307, the temperature of the pixel 101 changes due to the above-described heat insulation structure, and the forward voltage characteristic of the diode 303 operating as a temperature sensor changes. An output signal corresponding to the incident infrared light can be acquired by reading this change in the forward voltage characteristic of the diode 303 by means of a prescribed detection circuit. The thermal infrared solid state imaging device has numerous infrared detection pixels 101 arrayed in a two-dimensional matrix arrangement enabling sequentially accessing each pixel. It is important that all of the pixels in the solid state imaging device have uniform performance, and using diodes as the temperature sensors of the thermal infrared imaging device is particularly effective for improving uniform performance because there is little variation between the forward voltage and temperature dependence of individual diodes.

Except for not having the heat insulation structure and/or infrared absorption structure described above, the reference pixel 111 that detects the device temperature is structurally identical to the infrared detection pixels 101 in this embodiment of the invention. If sensitivity to infrared absorption can be lowered to the necessary level, either the heat insulation structure or the infrared absorption structure can remain. The response of the infrared detection pixel 101 to the device temperature can be accurately simulated by the reference pixel 111 outputting a reference signal, thereby enabling highly precise temperature drift correction.

1.3 Low-Pass Filter

Figure 4A:
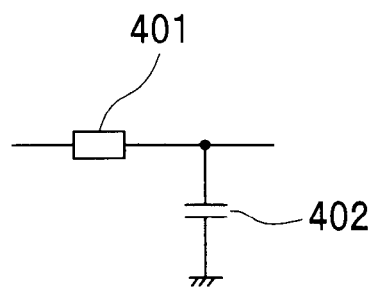
FIGS. 4A and 4B are circuit diagrams of a low-pass filter.
Figure 4B:
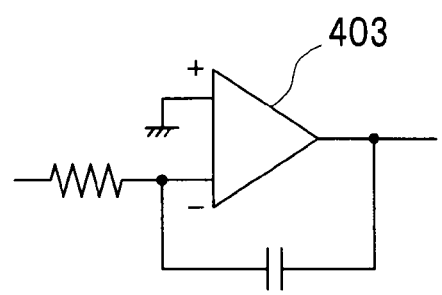

The low-pass filter 114 is used to cut noise produced by the reference pixel 111, the power supply 112, and the buffer amplifier 113 and extract only the temperature drift component. Possible arrangements of the low-pass filter 114 are shown in FIGS. 4A and 4B. The arrangement shown in FIG. 4A uses passive devices, and includes a resistance 401 and a capacitor 402. The resistance 401 could be replaced by a reactance. A reactance with no DC voltage drop is preferable in a filter that is inserted to the output on the buffer amplifier 113 side. The output resistance of the buffer amplifier 113 could be used for the resistance 401. The arrangement shown in FIG. 4B is an integration circuit that uses an operating amplifier 403 which is an active device. This arrangement is commonly used as a low-pass filter and further detailed description thereof is thus omitted.

1.4 S/H Circuit and Buffer Amplifier

Figure 5:
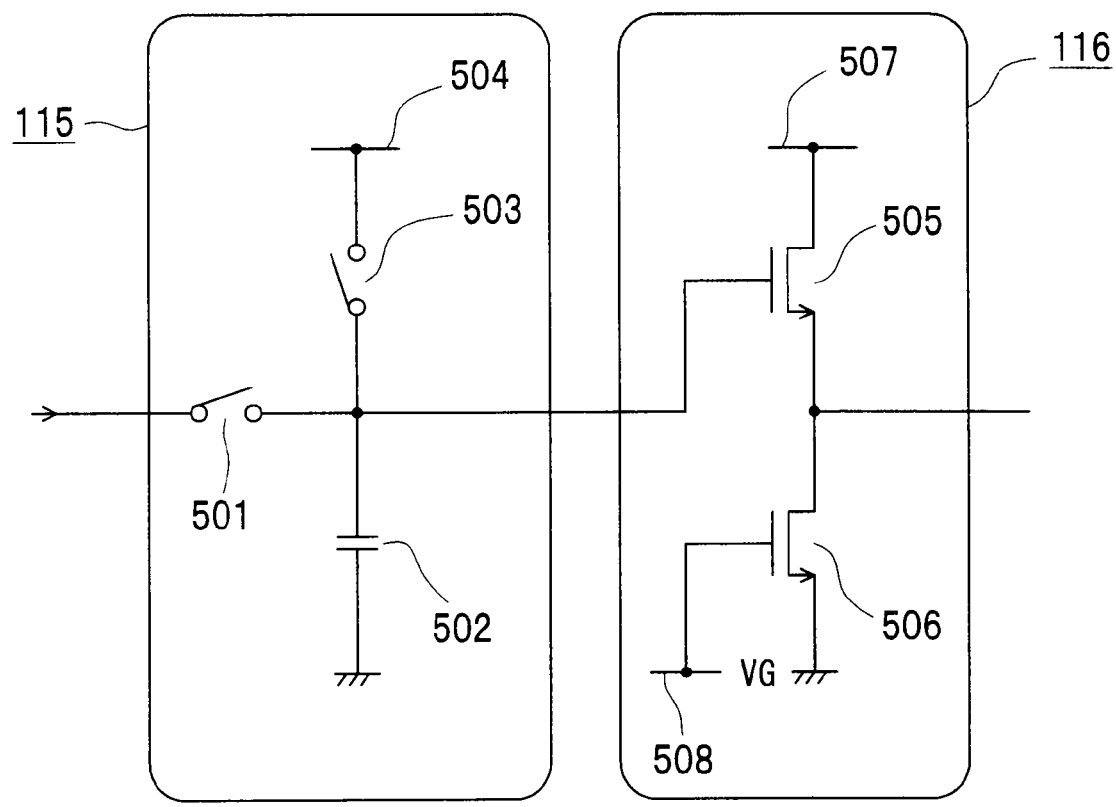
FIG. 5 is a circuit diagram of a S/H circuit and buffer amplifier in the thermal infrared solid state imaging device according to the first embodiment of the invention.

FIG. 5 is a circuit diagram of the sample-and-hold (S/H) circuit 115 and the buffer amplifier 116. The S/H circuit 115 includes a S/H switch 501, a S/H capacitor 502, and a reset switch 503 for the S/H capacitor 502. The buffer amplifier 116 is a source follower amplifier composed of a load transistor 506 and a driver transistor 505.

2. Operation of Thermal Infrared Solid State Imaging Device

The operation of the thermal infrared solid state imaging device according to this embodiment of the invention is described next with reference to FIGS. 1, 2, 6A, and 6B.

Figure 6B:
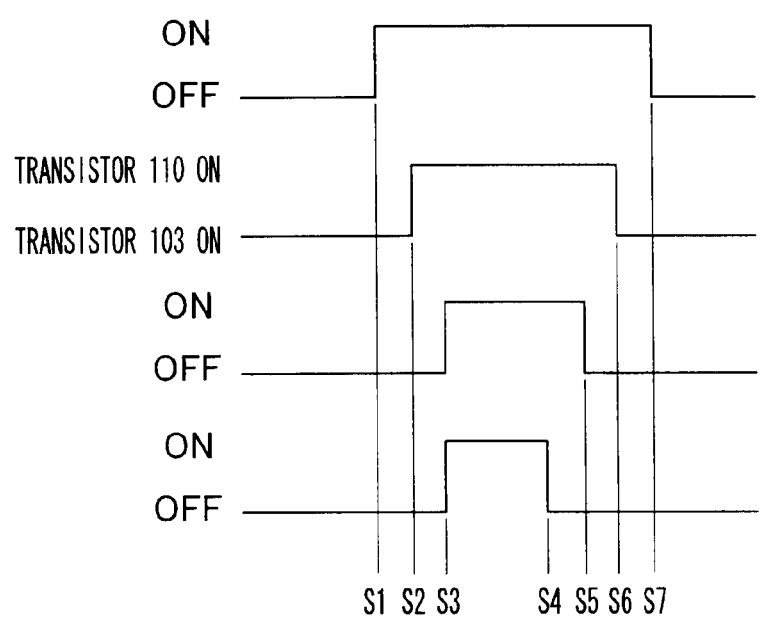
FIG. 6B is an enlarged view of a part of the timing chart showing the operating timing of the thermal infrared solid state imaging device according to the first embodiment of the invention.

FIG. 6A is a timing chart describing the operation of the thermal infrared solid state imaging device according to this embodiment of the invention. FIG. 6B is an enlarged view showing the states of the switches 201, 209, and 204 during the time the integrating capacitor reset switch 212 is on. Note that the states of the gate bias switch 204 and the gate connection switch 209 shown in FIG. 6B are not shown in FIG. 6A. As shown in FIG. 6A, when the S/H switch 214 turns off and sampling ends, the integrating capacitor reset switch 212 turns on and a reset period of the integrating capacitor 211 starts. During the rest period of the integrating capacitor 211, the gate connection switch 209 of the bias current supply transistor 206 is also conductive, and the gate of the bias current supply transistor 206 is connected to the drain.

As a result, the gate voltage of the bias current supply transistor 206 is automatically determined so that the current equal to the source-drain current flowing through the integrating transistor 203 flows to the bias current supply transistor 206. At this time, the gate bias switch 204 is also on and the bias voltage VB is applied to the gate of the integrating transistor 203. The current flowing through the bias current supply transistor 206 and the integrating transistor 203 is therefore a current determined by the bias voltage VB.

The output voltage of the reference pixel 111 is input to the gate of the integrating transistor 203 by the input selector switch 201 through the input coupling capacitor 202. A charge corresponding to the difference between the reference pixel 111 and the bias voltage VB is thus stored in the input coupling capacitor 202.

Then an integration period of the integrating capacitor 211 starts. First, the gate bias switch 204 turns off. The gate voltage of the integrating transistor 203 remains the bias voltage VB. The gate connection switch 209 then turns off. The operation of the hold capacitor 208 holds the current of the bias current supply transistor 206. The input selector switch 201 then switches to the infrared detection pixel 101 side. The operation of the input coupling capacitor 202 causes the gate voltage of the integrating transistor 203 to change from the bias voltage VB by the output difference of the infrared detection pixel 101 and transistor 103. When the integrating capacitor reset switch 212 then turns off, the current change equal to this difference times the mutual conductance of the integrating transistor 203 flows through the output coupling capacitor 210 to the integrating capacitor 211 and is integrated. Note that the reset period of the integrating capacitor is set during the horizontal blanking period, and substantially all of the remaining horizontal scanning period is used for the integration operation.

FIG. 6A (d) shows the waveform of the integrating capacitor 211 in this integration circuit. When infrared light equal to the ambient temperature is incident (when infrared light as reference to detect the infrared light is incident), there is substantially no change in the voltage of the integrating capacitor 211 during the integration period, with the change corresponding roughly to the line 601 in FIG. 6A (d).

To the contrary, when infrared light from a thermal body that differs in temperature from the ambient temperature is incident to the infrared detection pixel 101, the potential of the integrating capacitor 211 changes as indicated by lines 602 or 603. The reset switch 503 turns on before the prescribed integration period ends and resets the S/H capacitor 502. When the integration period ends, the S/H switch 501 turns on and the potential of the integrating capacitor 211 is transferred to the S/H capacitor 502. Thus, as shown in FIG. 6A (b), the integration time Ti is from when the integrating capacitor reset switch 212 opens (becomes nonconductive) until the S/H switch 214 opens.

In the thermal infrared solid state imaging device according to this embodiment of the invention, the input coupling capacitor 202 which provides AC coupling between the gate of the integrating transistor 203 and the input selector switch 201, functions to set the signal to be integrated to a signal equal to a signal that varies according to the incident infrared light minus the component that is denoted by the output of the reference pixel 111 and changes according to the device temperature, while holding the operating point of the integrating transistor 203 at VB. Hence, according to the arrangement shown in FIG. 1, even if the voltage drop distribution on the horizontal signal line 104 and dummy drive line 109 causes the input voltage of the differential integration circuit to differ on the left and right sides of the pixel area, the operating point of the integrating transistor 203 can be kept constant, eliminating variations in sensitivity due to the aforementioned voltage distribution.

The output coupling capacitor 210 providing AC coupling between the integrating transistor 203 and the integrating capacitor 211 in the thermal infrared solid state imaging device according to this embodiment of the invention, functions to balance the bias current setting operation and the integration operation. This is further described below.

In an operation of setting the bias current, that is, during the reset period, a current does not flow from the power supply 213 to the integrating transistor 203 because of the output coupling capacitor 210 intervening between the power supply 213 and the integrating transistor 203. As a result, the same current flows through the integrating transistor 203 and the bias current supply transistor 206, and the bias current can be determined based on the bias voltage VB.

During the integration operation, however, the output coupling capacitor 210 and integrating capacitor 211 render a serial capacitor, the change in the current from the bias current supply transistor 206 to the integrating transistor 203 flows to the capacitors 210 and 211, and thus integration occurs. More specifically, the integration is achieved by the serially connected capacitor of the output coupling capacitor 210 and integrating capacitor 211, and the integral is divided according to the capacitor. The coupling capacitor is therefore preferably set as high as possible in order to avoid a drop in gain resulting from this division. However there is no limitation for capacitor on the design, as long as the total gain of the difference integration circuit is held at a desired level.

According to the infrared solid state imaging device according to this embodiment, the voltage drop of the integrating capacitor 211 is substantially zero during the integration period when infrared light corresponding to the ambient temperature is incident to the thermal infrared solid state imaging device. As a result, the drive voltage can be reduced. Furthermore, because the output difference of the infrared detection pixel 101 and the reference pixel 111 is converted to a current for the integration operation, the change in device temperature can be cancelled and variation in output due to a change in ambient temperature can be suppressed. Setting the bias voltage, which is a factor that changes the output voltage, is also unnecessary.

The thermal infrared solid state imaging device according to this embodiment of the invention also requires only two transistors that contribute to the integration current: the bias current supply transistor 206 and the integrating transistor 203. The number of transistors contributing to noise can thus be greatly reduced compared with an arrangement that uses a difference voltage-current conversion amplifier for integration. For example, the technology taught in JP-A-2003-222555 has four transistors (two load transistors and two driver transistors) that contribute to noise, and thus produces $\sqrt{4}$ times more noise than a simple integration circuit that uses one integrating transistor. To the contrary, the thermal infrared solid state imaging device according to this embodiment of the invention has only two transistors contributing to noise, and noise output is therefore simply reduced from $\sqrt{4}$ times to $\sqrt{2}$ times because it has two transistors contributing to noise.

In addition, according to this embodiment of the invention, the thermal infrared solid state imaging device functions to cancel the 1/f noise, and thus the current noise can be yet further reduced. More particularly, the current flowing between the bias current supply transistor and the source-drain of the integrating transistor includes 1/f noise current, and the 1/f noise current which is included in the bias current is held during the reset period. The 1/f noise current is generally pronounced below 1 kHz, but the frequency of the integration operation is generally above 10 kHz, and the 1/f noise can be ignored during the integration period. Because the change from the bias current is the integration current during the integration period, the 1/f noise current is cancelled and not included in the integration current.

Because the current is flowing constantly when setting the bias current, the time required to set the gate bias can be shortened as disclosed in the patent document 2, the entire horizontal scanning period can be used for the integration time without requiring multiple samplings unlike the patent document 2, and the noise bandwidth can be reduced.

Note that while the reset noise is superimposed on the input coupling capacitor when the gate bias connection switch is off, the reset noise can also be suppressed because current variation due to this noise is also reflected in the bias current.

Note, further that the integrating capacitor reset switch 212, the gate connection switch 209 of the bias current supply transistor 206, the gate bias switch 204 of the integrating transistor 203, and the input selector switch 201 do not need to switch at the same precise time, and the timing at which they switch is preferably as described below.

As shown in FIG. 6B, the switches preferably turn on sequentially in the order: integrating capacitor reset switch 212 (time S1), input selector switch 201 (time S2), and gate connection switch 209 and gate bias switch 204 (time S3). The input selector switch 201 in particular preferably switches to the reference pixel 111 side after the integrating capacitor reset switch 212 turns on. This is because if the input selector switch 201 switches to the reference pixel 111 before the integrating capacitor reset switch 212 turns on, the integration current flowing to the integrating capacitor 211 during the period will not correctly reflects the incident infrared light.

The gate connection switch 209 can turn on before the input selector switch 201 switches, but it is important that the gate connection switch 209 turns on after the integrating capacitor reset switch 212 turns on for the same reason described above. The gate bias switch 204 could turn on before or after the gate connection switch 209 turns on, but preferably turns on after the input selector switch 201 switches to the input from the reference pixel 101.

As shown in FIG. 6B, the switches preferably turn off sequentially in the order: gate bias switch 204 (time S4), gate connection switch 209 (time S5), input selector switch 201 (time S6), and integrating capacitor reset switch 212 (time S7). More particularly, the integrating capacitor reset switch 212 preferably turns off after the input selector switch 201 switches to the infrared detection pixel 101 side. Because signal accumulation by the integrating capacitor 211 starts when the integrating capacitor reset switch 212 turns off, it is important that the infrared detection pixel 101 becomes ready to input the signal before the signal accumulation starts. It is also important that the gate connection switch 209 turns off before the other two switches. This enables correctly sampling the reference pixel bias current during the integrating capacitor reset period. It is also important that the gate bias switch 204 turns off before the gate connection switch 209 turns off. This enables sampling of the reset noise from the input coupling capacitor included in the bias current.

The integrating transistor 203 is an n-channel transistor and the bias current supply transistor 206 is a p-channel transistor in the foregoing embodiment, but the invention is not so limited. For example, the integrating transistor 203 could be a p-channel transistor and the bias current supply transistor 206 could be an n-channel transistor. In this case the integrating transistor is connected to the power supply and the bias current supply transistor is connected to ground.

Embodiment 2

Figure 7:
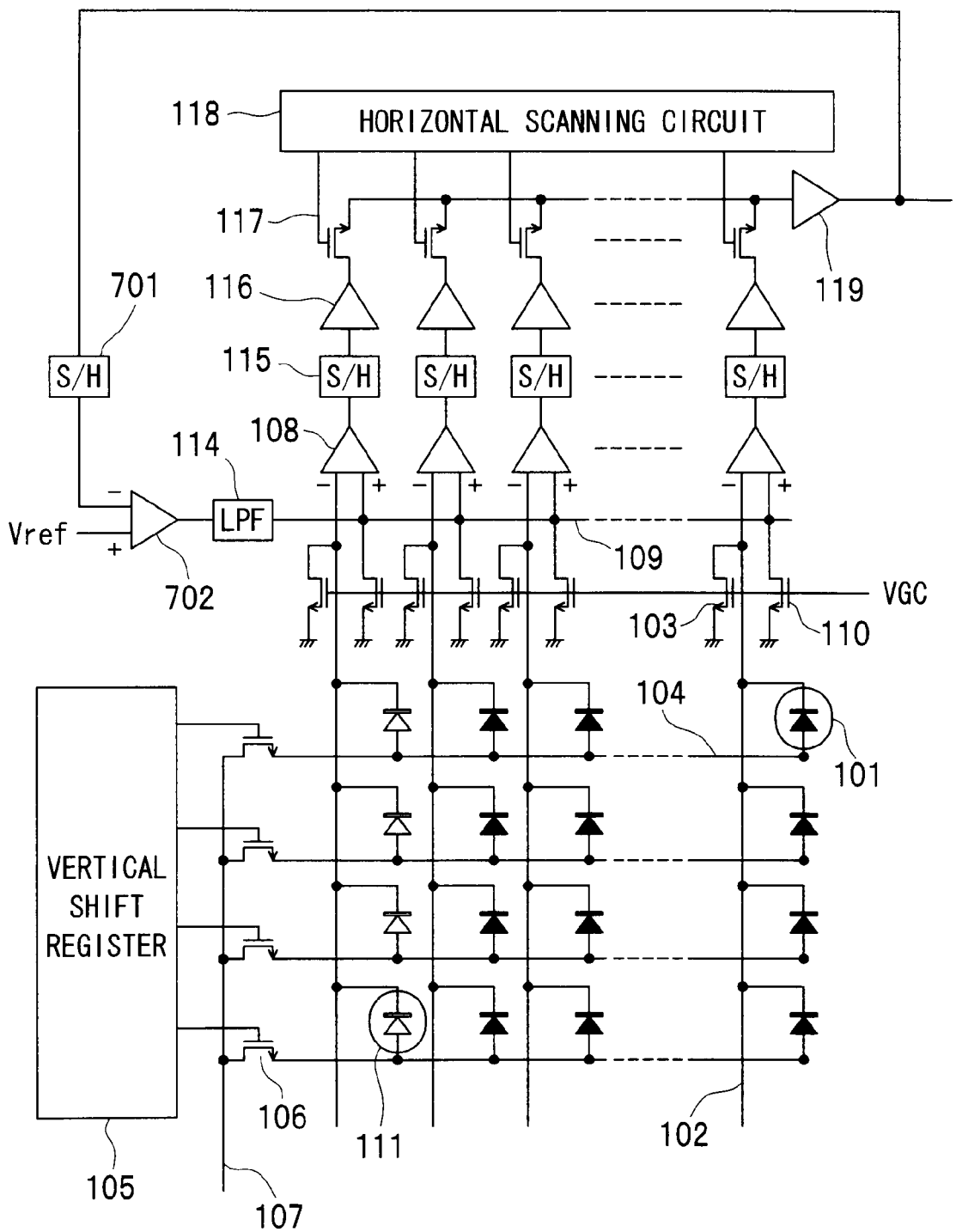
FIG. 7 is a circuit diagram of the thermal infrared solid state imaging device according to a second embodiment of the invention.

FIG. 7 is a circuit diagram of a thermal infrared solid state imaging device according to a second embodiment of the invention. This embodiment applies the difference integration circuit described in the first embodiment to the infrared solid state imaging device taught in JP-A-2005-214639 which was previously filed by the applicant of the present application. The reference pixels 111 are disposed at the ends of the horizontal pixel lines in this embodiment of the invention.

A sample-and-hold circuit 701 samples the output of the reference pixel 111 that is output via the output amplifier 119. A bias generating circuit 702 compares the output from the sample-and-hold circuit 701 with a reference voltage Vref, outputs a decreasing voltage if the output of the reference pixel becomes greater than the reference voltage Vref, and outputs an increasing voltage if the reference pixel output becomes less than the reference voltage. The output voltage is applied through the low-pass filter 114 to the dummy drive line 109. The differential integration circuit 108 is identical to that shown in FIG. 2.

In addition to the effect of the first embodiment, this arrangement applies feedback that keeps the reference pixel output always steady at the reference voltage Vref even if the reference pixel output varies due to the device temperature or deviation between devices. More specifically, this embodiment affords an infrared solid state imaging device with more stable output.

Figure 8:
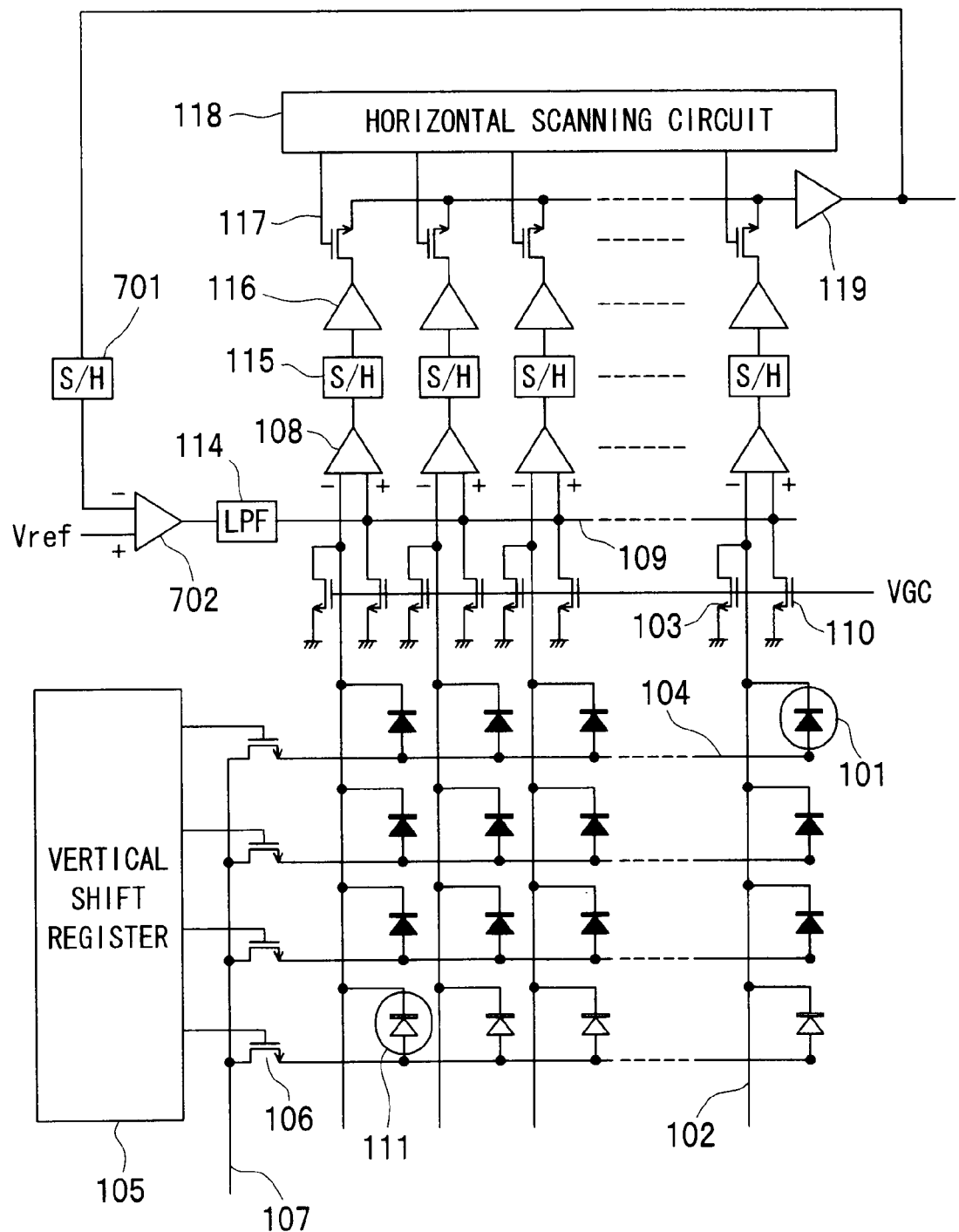
FIG. 8 is a circuit diagram of the thermal infrared solid state imaging device according to a second embodiment of the invention.

The location of the reference pixel 111 is not limited to the end, and can be any place outside of the effective pixel area required for imaging. For example, as shown in FIG. 8, the reference pixels 111 can be disposed in a line at the end of the vertical pixel columns.

Embodiment 3

Figure 9:
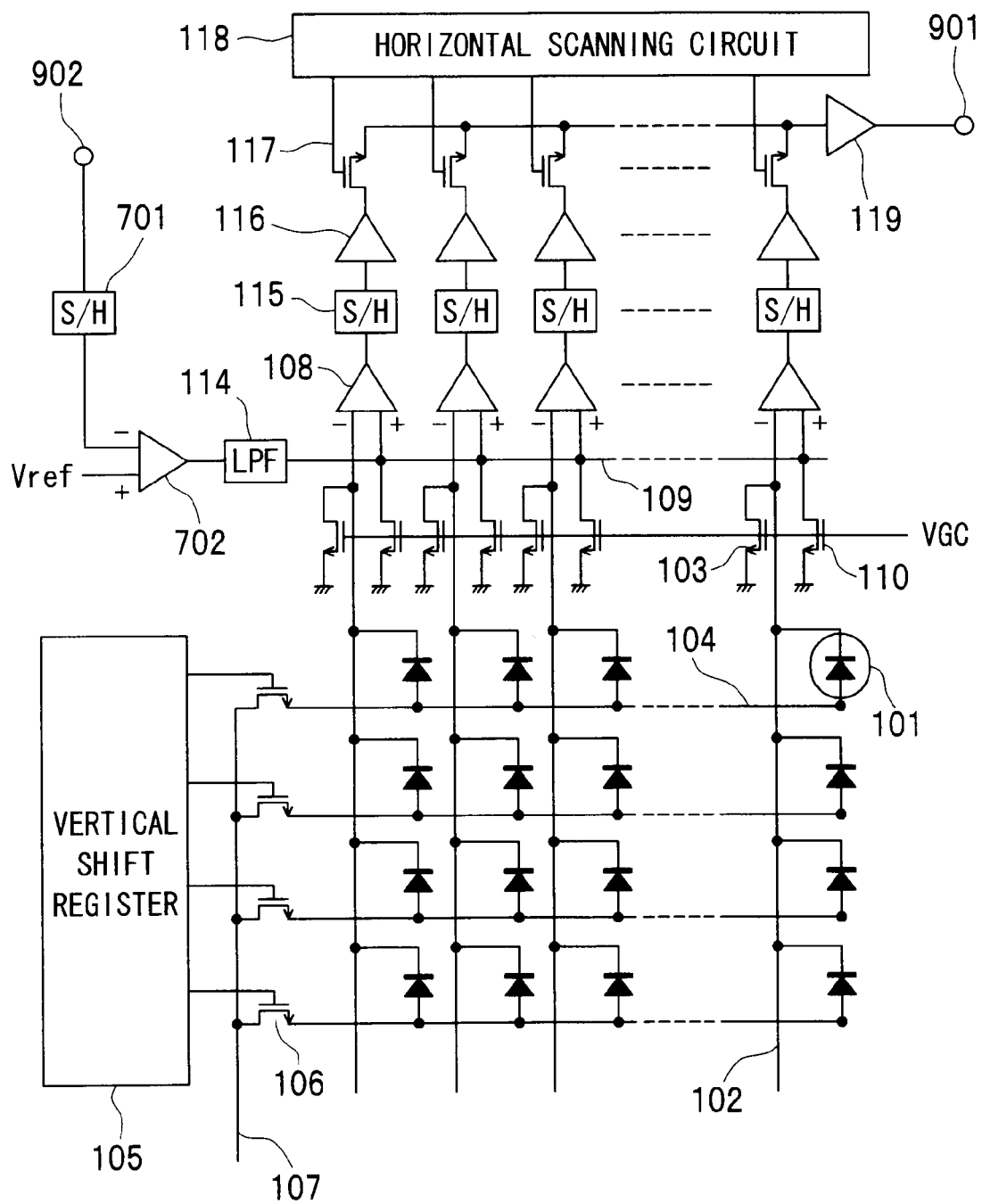
FIG. 9 is a circuit diagram of the thermal infrared solid state imaging device according to a third embodiment of the invention.

FIG. 9 is a circuit diagram of a thermal infrared solid state imaging device according to a third embodiment of the invention. This embodiment applies the difference integration circuit described in the first embodiment to the infrared solid state imaging device taught in JP-A-2005-236717 which was previously filed by the applicant of the present application. In this embodiment, no reference pixel is used, and the entire pixel area is composed of infrared detection pixels 101.

Figure 10A:
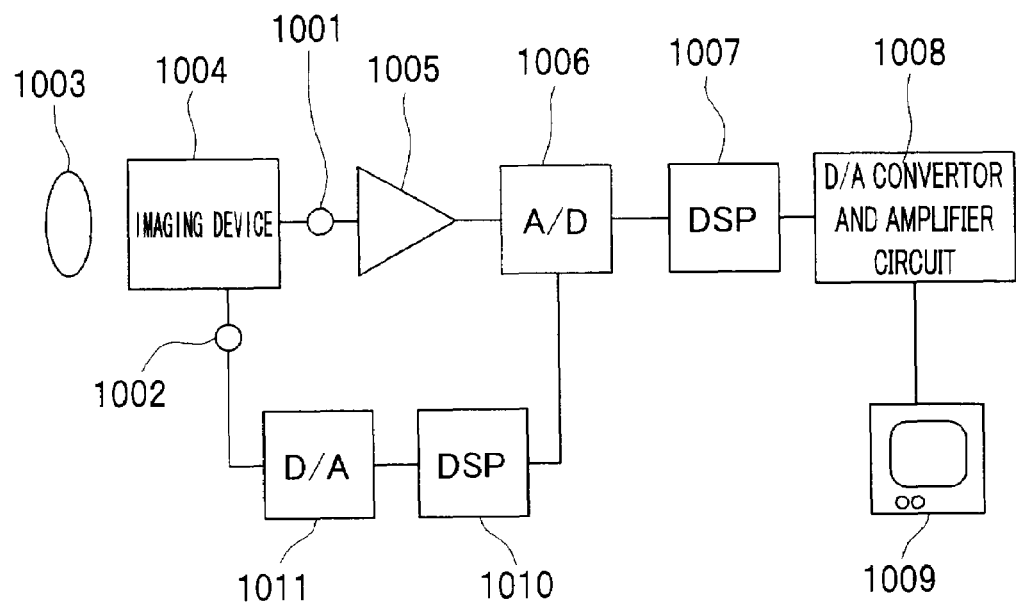
FIGS. 10A and 10B are block diagrams of an infrared camera using the thermal infrared solid state imaging device according to the third embodiment of the invention.
Figure 10B:
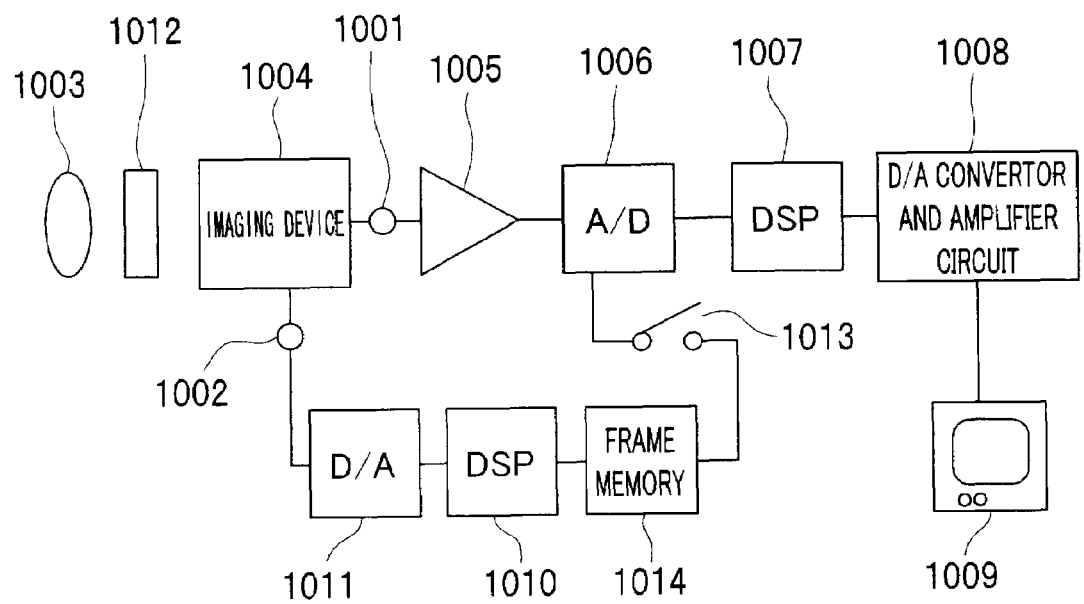

FIGS. 10A and 10B are schematic diagrams of infrared cameras that use the infrared solid state imaging device according to the present embodiment.

The infrared camera shown in FIG. 10A has an infrared solid state imaging device 1004, a lens 1003, a pre-amplifier 1005, an A/D converter 1006, a digital signal processor (DSP) 1007, and D/A converter and amplifier circuit 1008. The lens 1003 focuses infrared light emitted by a subject on the infrared solid state imaging device 1004. The pre-amplifier 1005 amplifies the image signal output from the output terminal 1001 of the infrared solid state imaging device 1004. The A/D converter 1006 converts the analog image signal form the pre-amplifier 1005 to a digital image signal. The DSP 1007 processes the digital image signal output from the A/D converter 1006. The D/A converter and amplifier circuit 1008 has both a function for converting the processed signal to an analog signal and an amplification function. The infrared camera outputs the captured image to a monitor 1009. The A/D converter 1006 is connected to a digital signal processor (DSP) 1010 that functions as an averaging circuit, and the DSP 1010 computes the average (output average) of the digitized image signal output from the A/D converter 1006. The computed output average is returned to an analog signal by a D/A converter 1011 connected to the DSP 1010. The resulting analog signal is input through the terminal 1002 of the infrared solid state imaging device 1004 to the sample-and-hold circuit 701, and is held at a prescribed timing. The held output average is compared with the reference voltage Vref by the bias generating circuit 702, which outputs a bias voltage based on the difference between the average and the reference voltage Vref.

In this embodiment of the invention, the output average generated by the DSP 1010 as an averaging circuit reflects the temperature drift component caused by change in temperature of the device. Therefore, by generating the bias voltage according to the difference between the output average and the reference voltage Vref, the temperature drift component caused by the device temperature change can be removed from the image output, and feedback is provided so that the average output of the pixel area is equal to the reference voltage Vref. More specifically, in addition to the effect of the second embodiment, an infrared solid state imaging device with more stable output can be achieved.

With the arrangement shown in FIG. 10A the average output may be affected by the incident infrared light. FIG. 10B shows the arrangement of an infrared camera that can remove this effect. The arrangement shown in FIG. 10B has a shutter 1012 disposed to the incidence side of the infrared solid state imaging device 1004. Frame memory 1014 and a switch 1013 that turns on simultaneously to the shutter 1012 closing are also disposed between the DSP 1010 (averaging circuit) and the A/D converter 1006. In the example shown in FIG. 10B the output of the A/D converter 1006 when infrared light incident to the pixel area is blocked is stored in the frame memory 1014, and this output is averaged by the DSP 1010. Because the output average is thus calculated based on the image output when infrared light incident to the pixel area is blocked, the effect of incident infrared light that is a problem with the arrangement shown in FIG. 10A is eliminated.

Embodiment 4

In the foregoing embodiments, arrangements in which the pixel includes a PN junction diode, but the pixel is not so limited and can include any device in which electrical characteristic of the pixel changes according to pixel temperature. For example, a Schottky junction diode can be used, as well as polysilicon, amorphous silicon, vanadium oxide, or other type of resistance bolometer. A bolometer refers to a material of which the electrical resistance changes with temperature.

Figure 11:
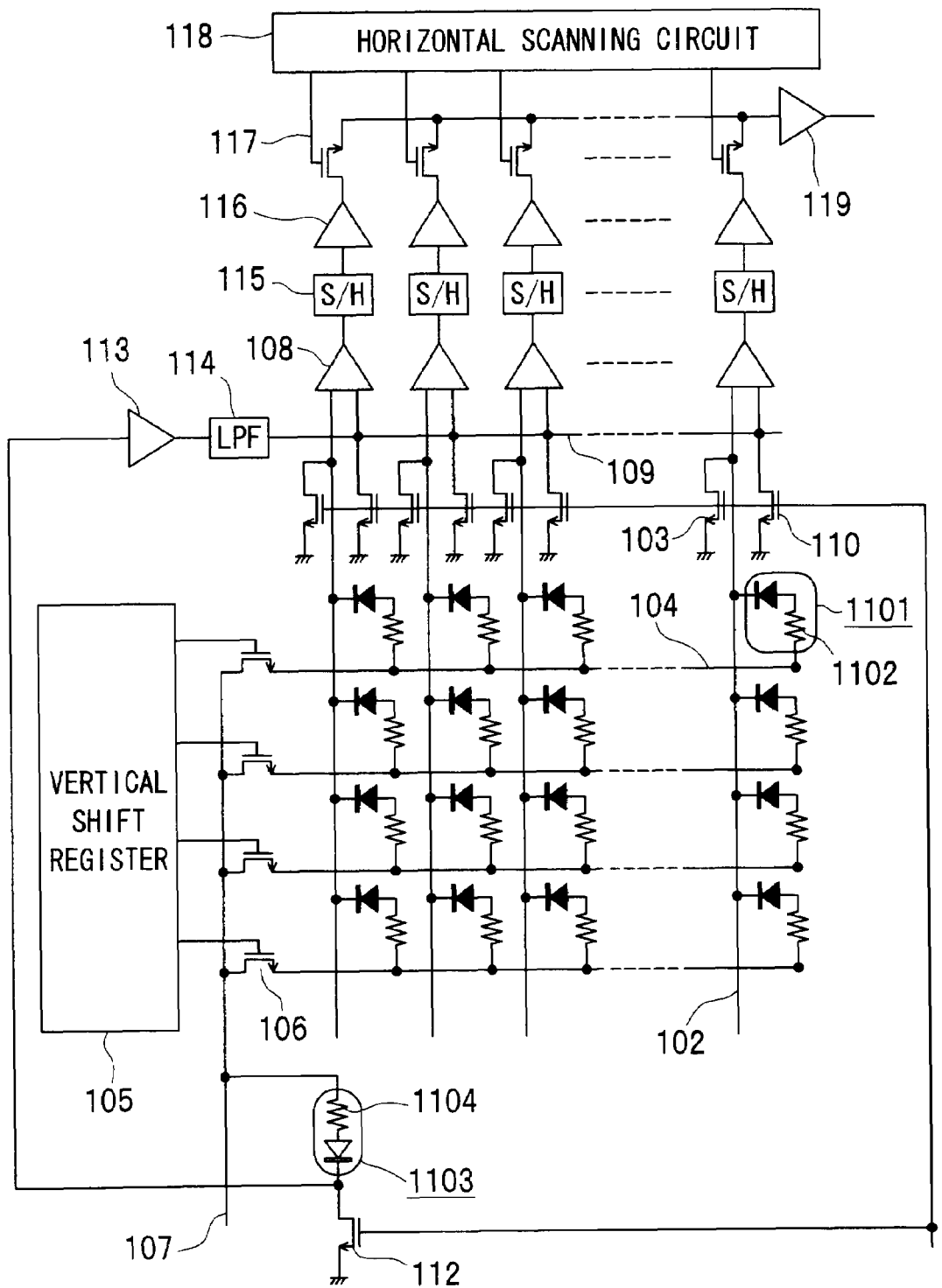
FIG. 11 is a circuit diagram of the thermal infrared solid state imaging device according to a fourth embodiment of the invention.

FIG. 11 is a circuit diagram schematically showing a thermal infrared solid state imaging device according to a fourth embodiment of the invention. In this embodiment of the invention resistance bolometers 1102 and 1104 are used instead of PN junction diodes for the temperature sensor of the infrared detection pixels 1101 and the reference pixel 1103. The reference pixel 1103 is identical to that of the first embodiment, omitting the infrared absorption structure and/or heat insulation structure of the infrared detection pixels 1101.

In this embodiment a diode is connected in each pixel. When the pixels are connected as shown in FIG. 11, the diode works as switches preventing a current from flowing into pixels on lines other than the selected line. While the temperature variation rate of the forward voltage of a common diode is on the order of 0.1%/K, a resistance bolometer has a rate of several %/K. In addition to the effect of the first embodiment, greater sensitivity can be achieved. Uniformity between pixels is not as good as with PN junction diodes, however, and PN junction diodes are therefore preferable in a sensor with many pixels.

This embodiment describes an example in that the difference integration circuit shown in FIG. 2 is applied to an infrared solid state imaging device with the pixels in a two-dimensional array. However it will be obvious that the difference integration circuit can also be applied to an infrared solid state imaging device with a one-dimensional array of pixels. It will also be obvious that the arrangement of the infrared camera shown in FIGS. 10A and 10B can also be adapted to the infrared solid state imaging devices described in the first, second, and fourth embodiments above.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2007-99640, filed on Apr. 5, 2007, which is expressly incorporated herein by reference in its entirety.

What is claimed is:

1. A thermal infrared solid state imaging device comprising:
    a pixel area having a two-dimensional array of infrared detection pixels, the infrared detection pixel including at least one or more serially connected temperature detection devices having a heat insulation structure and an infrared absorption structure;
    a plurality of drive lines, each drive line connecting the anodes of the pixels in common by row;
    a plurality of signal lines, each signal line connecting the cathodes of the pixels in common by column and connected to a first constant current device at the end of each column;
    a vertical scanning circuit that sequentially selects the drive line and connects the selected drive line to a power supply;
    a second constant current device that is disposed to each signal line near the first constant current device, and supplies a current substantially equal to a current by the first constant current device;
    an integration circuit that outputs a current modulated by the difference in potential between the first constant current device and the second constant current device;
    a sample-and-hold circuit that samples and holds the output of the integration circuit; and
    a horizontal scanning circuit that selects the output of the sample-and-hold circuit by column,
    wherein the integration circuit includes
        an integrating transistor that modulates the output current based on the difference in potential between the first constant current device and the second constant current device,
        an integrating capacitor that stores the modulated current and is periodically reset to a reference voltage,
        a bias current supply transistor that has a gate connected to a holding capacitor and is connected in series to the integrating transistor,
        a gate connection switch that connects and disconnects a node between the bias current supply transistor and the integrating transistor with the gate of the bias current supply transistor, an output coupling capacitor that provides AC coupling between the node and the integrating capacitor, a gate bias switch that is connected to the gate of the integrating transistor and can supply a bias voltage, an input selector switch that is connected to the gate of the integrating transistor, and selects, as input to the integration circuit, either one of the potential of the first constant current device and the potential of the second constant current device, and an input coupling capacitor that provides AC coupling between the input selector switch and the gate of the integrating transistor.

2. The thermal infrared solid state imaging device according to claim 1, wherein:

during a reset period of the integrating capacitor, the input selector switch is connected to the potential of the second constant current device, and the gate connection switch and gate bias switch are closed; and during an integration period of the integrating capacitor, the input selector switch is connected to the potential of the first constant current device, and the gate connection switch and the gate bias switch are open.

3. The thermal infrared solid state imaging device according to claim 2, wherein the reset period of the integrating capacitor is set in a horizontal blanking period, and substantially all of the remaining horizontal scanning period is set as the integration period; and the timing at which the gate bias switch opens is set before the timing at which the gate connection switch opens.

4. The thermal infrared solid state imaging device according to claim 1, further comprising:

a bias line that commonly connects the input nodes of the second constant current device in parallel to the drive line, and has resistance substantially equal to the drive line;

a reference pixel that is disposed outside the pixel area and is structurally identical to the infrared detection pixel except for not having a heat insulation structure and/or infrared absorption structure;

a third constant current device that is connected to the reference pixel and supplies a current equal to a current from the first constant current device; and a buffer amplifier and low-pass filter connected between the output of the reference pixel output and the bias line.

5. The thermal infrared solid state imaging device according to claim 1, further comprising:

a bias line that commonly connects the input nodes of the second constant current devices in parallel to the drive line, and has resistance substantially equal to the drive line;

a reference pixel that is disposed inside the pixel area and is structurally identical to the infrared detection pixel except for not having a heat insulation structure and/or infrared absorption structure;

a second sample-and-hold circuit that samples and holds the output of a device relating to the reference pixel; and a bias generating circuit that generates a bias voltage according to the difference between the output of the second sample-and-hold circuit and a reference voltage to apply the bias voltage to the bias line.

6. The thermal infrared solid state imaging device according to claim 1, further comprising:

a bias line that commonly connects the input nodes of the second constant current device in parallel to the drive line, and has resistance substantially equal to the drive line;

a bias generating circuit that generates a bias voltage according to the difference between a reference voltage and the average output of all or part of the devices in the pixel area, to apply the bias voltage to the bias line.

7. The thermal infrared solid state imaging device according to claim 1, wherein the temperature detection device is a PN junction diode or a resistance bolometer.

8. An infrared camera comprising:

a thermal infrared solid state imaging device according to claim 1;

an optical system for focusing an infrared image on the thermal infrared solid state imaging device; and an amplifier circuit for amplifying and outputting an image signal output from the thermal infrared solid state imaging device.

9. A thermal infrared solid state imaging device comprising:

a pixel area having a one-dimensional or two-dimensional array of infrared detection pixels having a heat insulation structure and infrared absorption structure;

a reference pixel that is structurally identical to the infrared detection pixels except for not having a heat insulation structure and/or infrared absorption structure;

integration circuits each of which modulates a current of an integrating transistor according to difference in output of the infrared detection pixel and the reference pixel, and stores the modulated current in an integrating capacitor that is periodically reset to a reference voltage;

sample-and-hold circuits each of which samples and holds the output of the corresponding integration circuit; and a horizontal scanning circuit that selects the output of the sample-and-hold circuit by column;

wherein the integration circuit includes an integrating transistor that modulates the output current based on the difference in potential between a first constant current device and a second constant current device, an integrating capacitor that stores the modulated current and is periodically reset to a reference voltage, a bias current supply transistor that has a gate connected to a holding capacitor and is connected in series to the integrating transistor, a gate connection switch that connects and disconnects a node between the bias current supply transistor and the integrating transistor with the gate of the bias current supply transistor, an output coupling capacitor that provides AC coupling between the node and the integrating capacitor, a gate bias switch that is connected to the gate of the integrating transistor and can supply a bias voltage, an input selector switch that is connected to the gate of the integrating transistor, and selects, as input to the integration circuit, either one of the potential of the first constant current device and the potential of the second constant current device, and an input coupling capacitor that provides AC coupling between the input selector switch and the gate of the integrating transistor.

10. The thermal infrared solid state imaging device according to claim 9, wherein during a reset period of the integrating capacitor, the input selector switch is connected to the potential of the second constant current device, and the gate connection switch and gate bias switch are closed; and during an integration period of the integrating capacitor, the input selector switch is connected to the potential of the first constant current device, and the gate connection switch and the gate bias switch are open.

11. The thermal infrared solid state imaging device according to claim 10, wherein
the reset period of the integrating capacitor is set in a horizontal blanking period, and substantially all of the remaining horizontal scanning period is set as the integration period; and
the timing at which the gate bias switch opens is set before the timing at which the gate connection switch opens.

12. An infrared camera comprising:
a thermal infrared solid state imaging device according to claim 9;
an optical system for focusing an infrared image on the thermal infrared solid state imaging device; and
an amplifier circuit for amplifying and outputting an image signal output from the thermal infrared solid state imaging device.

* * * * *